(12) United States Patent
Cooley

(10) Patent No.: US 11,713,794 B2
(45) Date of Patent: Aug. 1, 2023

(54) PISTON HOUSING ASSEMBLY

(71) Applicant: GOODRICH CORPORATION, Charlotte, NC (US)

(72) Inventor: Phillip E. Cooley, Kettering, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 199 days.

(21) Appl. No.: 17/367,170

(22) Filed: Jul. 2, 2021

(65) Prior Publication Data

US 2022/0056980 A1    Feb. 24, 2022

Related U.S. Application Data

(60) Provisional application No. 63/068,700, filed on Aug. 21, 2020.

(51) Int. Cl.
  *F16F 15/04* (2006.01)
  *B64C 25/42* (2006.01)

(52) U.S. Cl.
  CPC .............. *F16F 15/04* (2013.01); *B64C 25/42* (2013.01)

(58) Field of Classification Search
  CPC .................................. F16F 15/04; B64C 25/42
  See application file for complete search history.

(56) References Cited

U.S. PATENT DOCUMENTS

| | | | |
|---|---|---|---|
| 4,296,897 A * | 10/1981 | Thompson | B60T 11/34 244/111 |
| 5,806,794 A * | 9/1998 | Hrusch | F16D 55/36 244/110 A |
| 7,717,240 B2 | 5/2010 | Anderson et al. | |
| 9,938,003 B2 | 4/2018 | Rook | |
| 9,958,068 B2 | 5/2018 | Hinton et al. | |
| 10,252,477 B2 | 4/2019 | Stevenson et al. | |
| 2005/0194220 A1 | 9/2005 | Edmisten | |
| 2008/0135349 A1* | 6/2008 | Himes | F16D 65/0043 188/156 |
| 2019/0226538 A1 | 7/2019 | Dirgo et al. | |

OTHER PUBLICATIONS

European Patent Office; Extended European Search Report dated Jan. 28, 2022 in Application No. 21191846.1.

* cited by examiner

*Primary Examiner* — Melanie Torres Williams
(74) *Attorney, Agent, or Firm* — Snell & Wilmer L.L.P.

(57) ABSTRACT

A piston housing may comprise: a main annular ring defining a main bore; a torque takeout annular ring defining a torque takeout bore; a torque takeout arm extending from the main annular ring to the torque takeout annular ring and defining an aperture therethrough; and a structural rib disposed within the aperture and extending from the main annular ring to the torque takeout annular ring.

20 Claims, 5 Drawing Sheets

SECT A-A

| Coupling a first end of a structural rib to a main annular ring of a piston housing assembly |  |

| Coupling a second end of the structural rib to a torque takeout annular ring of the piston housing assembly |  |

PISTON HOUSING ASSEMBLY

CROSS-REFERENCE TO RELATED APPLICATIONS

This application is a non-provisional of, and claims priority to, and the benefit of U.S. Provisional Application No. 63/068,700, entitled "PISTON HOUSING ASSEMBLY," filed on Aug. 21, 2020, which is hereby incorporated by reference in its entirety for all purposes.

FIELD

The disclosure relates generally to aircraft brake systems and aircraft brake actuation systems, and more specifically to piston housing assemblies.

BACKGROUND

Aircraft often include one or more landing gear that comprise one or more wheels. A braking system may typically be coupled to the wheel(s) in order to decelerate or park the aircraft. Under various conditions, brake actuation may yield friction-induced vibration at disk wear faces that may induce dynamic coupling of a piston housing and/or brake rod. With ever evolving brake actuation designs, higher torque and higher loads may result in increased friction-induced vibration.

SUMMARY

A piston housing is disclosed herein. The piston housing may comprise: a main annular ring defining a main bore; a torque takeout annular ring defining a torque takeout bore; a torque takeout arm extending from the main annular ring to the torque takeout annular ring and defining an aperture therethrough; and a structural rib disposed within the aperture and extending from the main annular ring to the torque takeout annular ring.

In various embodiments, the torque takeout arm is configured to provide for transfer of torque from a brake rod coupled to the torque takeout bore to an axle coupled to the main bore. The structural rib may be configured to dampen vibration of the piston housing during a braking event. The piston housing may further comprise a first chamber configured to house a first piston and a second chamber configured to house a second piston, the first chamber and the second chamber being supported by the torque takeout arm. The torque takeout arm may comprise a first leg extending from the main annular ring to the first chamber and a second leg extending from the first chamber to the torque takeout annular ring. The torque takeout arm may further comprise a third leg extending from the main annular ring to the second chamber and a fourth leg extending from the second chamber to the torque takeout annular ring. The piston housing may further comprise a plurality of chambers disposed radially outward of the main annular ring, each chamber in the plurality of chambers configured to house a piston therein. The plurality of chambers may include a first chamber and a second chamber, and the torque takeout arm may structurally couple the main annular ring, the first chamber, the torque takeout ring, and the second chamber together. The piston housing may be a monolithic component.

A system for mitigating vibrations in an aircraft brake system is disclosed herein. The system may comprise: a main annular ring defining a main bore, the main bore configured to couple to an axle of a landing gear assembly; a torque takeout annular ring defining a torque takeout bore, the torque takeout bore configured to couple to a brake rod of the landing gear assembly; a torque takeout arm extending from the main annular ring to the torque takeout annular ring and defining an aperture therethrough, the torque takeout arm configured to provide for transfer of torque from the brake rod to the axle; and a structural rib disposed within the aperture and configured to dampen vibration of the system during a braking event.

In various embodiments, the structural rib extends from the main annular ring to the torque takeout annular ring. The torque takeout arm may extend from the main annular ring to the torque takeout annular ring. The system may further comprise a first chamber configured to house a first piston and a second chamber configured to house a second piston, the first chamber and the second chamber being supported by the torque takeout arm. The torque takeout arm may comprise a first leg extending from the main annular ring to the first chamber and a second leg extending from the first chamber to the torque takeout annular ring. The torque takeout arm may further comprise a third leg extending from the main annular ring to the second chamber and a fourth leg extending from the second chamber to the torque takeout annular ring. The system may further comprise a plurality of chambers disposed radially outward of the main annular ring, each chamber in the plurality of chambers configured to house a piston therein. The plurality of chambers may include a first chamber and a second chamber, and the torque takeout arm may structurally couple the main annular ring, the first chamber, the torque takeout ring, and the second chamber together. The system may further comprise a piston housing, the piston housing being a monolithic component.

A method of retrofitting a structural rib on a piston housing assembly is disclosed herein. The method may comprise: coupling a first end of the structural rib to a main annular ring of the piston housing assembly; coupling a second end of the structural rib to a torque takeout annular ring of the piston housing assembly, wherein the structural rib is disposed within an aperture defined by a torque takeout arm extending from the main annular ring to the torque takeout annular ring.

In various embodiments, the first end is coupled to the main annular ring via at least one of welding or brazing, and the second end is coupled to the torque takeout annular ring via at least one of welding or brazing.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Because the disclosure was conceived and developed for use in an aircraft braking system, it will be herein described chiefly in this context. However, the principles of this disclosure in their broader aspects can be adapted to other types of braking systems, such as in train brake systems.

Disclosed herein is a structural rib for use in a piston housing assembly. In various embodiments the piston housing assembly comprises a torque arm coupling a main annular ring, a first chamber housing a first piston, a torque takeout annular ring, and a second chamber housing a second piston together. In various embodiments, the torque takeout arm may define an aperture between the main annular ring and the torque takeout annular ring. In various embodiments, a structural rib may extend from the main annular ring to the torque takeout annular ring within the aperture. In various embodiments, the structural rib may be configured to dampen vibrations of the braking system during a braking event. In various embodiments, the vibrational mode may include at least one of a torsional mode, a bending mode, a longitudinal mode, or a combination thereof.

Figure 1:
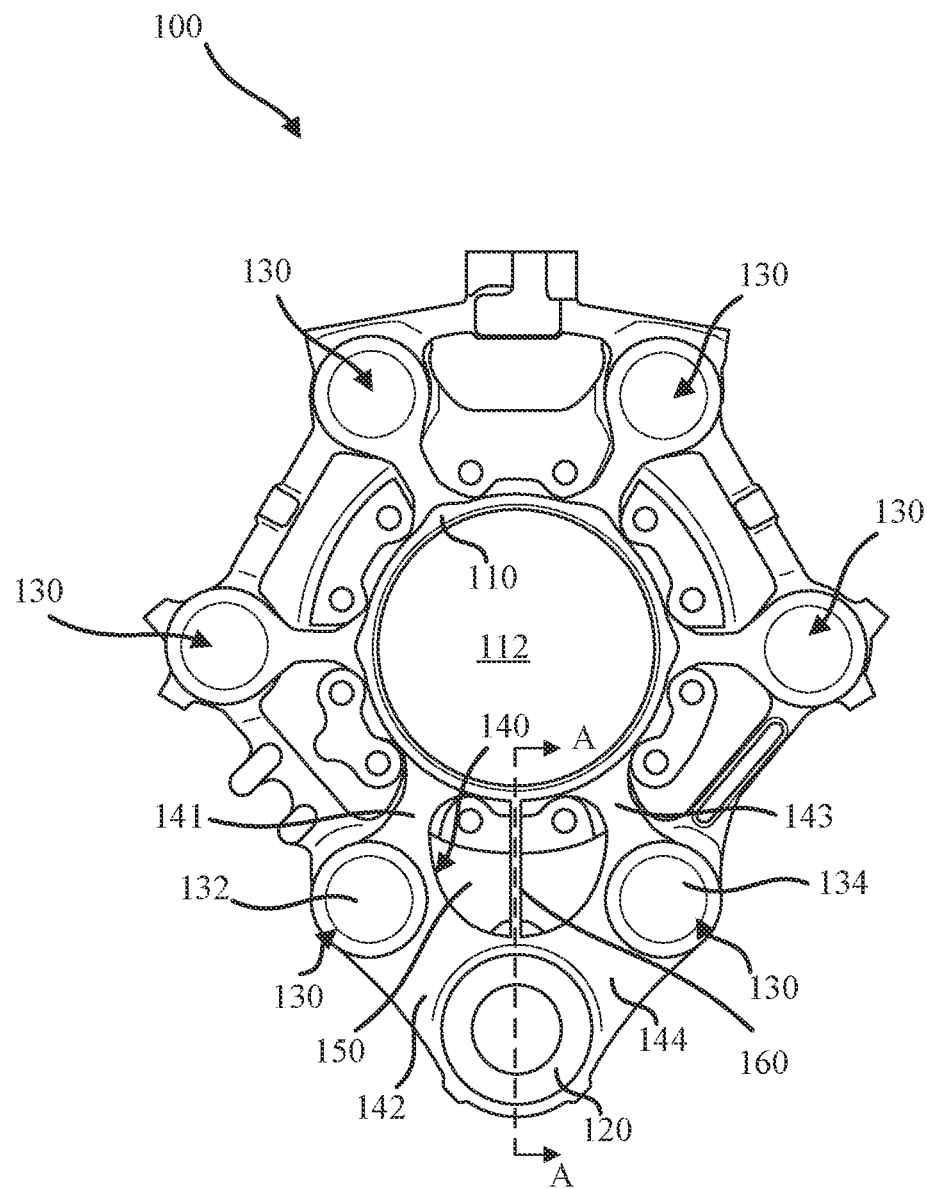
FIG. 1 illustrates a piston housing for use in an aircraft braking system, in accordance with various embodiments.

Referring now to FIG. 1, a piston housing for use in an aircraft brake system, is illustrated, in accordance with various embodiments. The piston housing 100 comprises a main annular ring 110 defining a main bore 112, a torque takeout annular ring 120 defining a takeout bore 122, and a plurality of chambers 130. In various embodiments, the main bore 112 is configured for mounting the piston housing 100 on a landing gear axle, or other wheel support. In various embodiments, each chamber in the plurality of chambers 130 disposed radially outward from the main annular ring 110. The plurality of chambers 130 are configured to receive a hydraulic fluid and create a hydraulic pressure. In this regard, one or more chambers in the plurality of chambers 130 may be in fluid communication with one another (e.g., a first chamber 132 may be in fluid communication with a second chamber 134). In various embodiments, each chamber in the plurality of chambers 130 is configured to house a respective piston for use in a multi-disk braking system.

In various embodiments, the piston housing 100 further comprises a torque takeout arm 140 disposed between the main annular ring 110 and the torque takeout annular ring 120. In various embodiments, the torque takeout arm 140 comprises a first leg 141, a second leg 142, a third leg 143, and a fourth leg 144. The first leg 141 extends from the main annular ring 110 radially outward to a first chamber 132 in the plurality of chambers 130. The second leg extends from the first chamber 132 in the plurality of chambers 130 to the torque takeout annular ring 120. Similarly, the third leg extends from the main annular ring 110 radially outward to a second chamber 134 in the plurality of chambers 130, and the fourth leg extends from the second chamber 134 in the plurality of chambers 130 to the torque takeout annular ring 120.

In various embodiments, the torque takeout arm 140 functions as a torque transfer interface between piston housing 100 and a landing gear axle/strut/truck structure. In particular, the torque takeout arm 140 structurally couples the torque takeout annular ring 120 to the main annular ring 110 and is configured to provide for transfer of torque from the torque takeout annular ring to the landing gear/axle/strut/truck structure when braking force is applied to a disk brake stack by a plurality of pistons disposed in the plurality of chambers 130.

In various embodiments, the torque takeout annular ring 120 defines an aperture 150 is disposed between the main annular ring 110 and the torque takeout. In various embodiments, by combining support for the first chamber 132, the second chamber 134 with the torque takeout annular ring 120 via the torque takeout arm 140, a weight of the piston housing 100 may be optimized. In various embodiments, a reduced number of pistons disposed around the piston housing 100 may result in aperture 150 being a larger aperture disposed between the first chamber 132 and the second chamber 134. Furthermore, ever increasing optimization of aircraft braking systems and designs may result in greater torque and greater loads relative to typical systems and designs. In this regard, as the size of aperture 150 becomes greater and a total distance between the torque takeout annular ring and the main annular ring may become greater. In this regard, the piston housing 100 may become susceptible to vibrations due to the increased distance.

In various embodiments, the piston housing 100 further comprises a structural rib 160. In various embodiments, the structural rib 160 may extend from the main annular ring 110 to the torque takeout annular ring 120, although the structural rib 160 is not limited in this regard. In particular, the structural rib is sized and configured to dampen vibrations of the piston housing 100 during a braking operation. As such, one skilled in the art may recognize various designs and configurations to dampen vibrations of the piston housing 100.

In various embodiments, the piston housing 100 may be a monolithic component (e.g., formed of a unitary component). Although the piston housing 100 described herein may be a monolithic component, in various embodiments, the piston housing 100 also is configured for installation of many other components to function, including orifices in the hydraulic passageways, plugs to seal the hydraulic passageways, piston adjuster assemblies, etc. In various embodiments, a structural rib 160 may be retrofitted to an existing piston housing by welding the structural rib 160 to the main annular ring on a first end of the structural rib 160 and welding the structural rib 160 to the torque takeout annular ring 120 on a second side of the structural rib 160.

Figure 2:
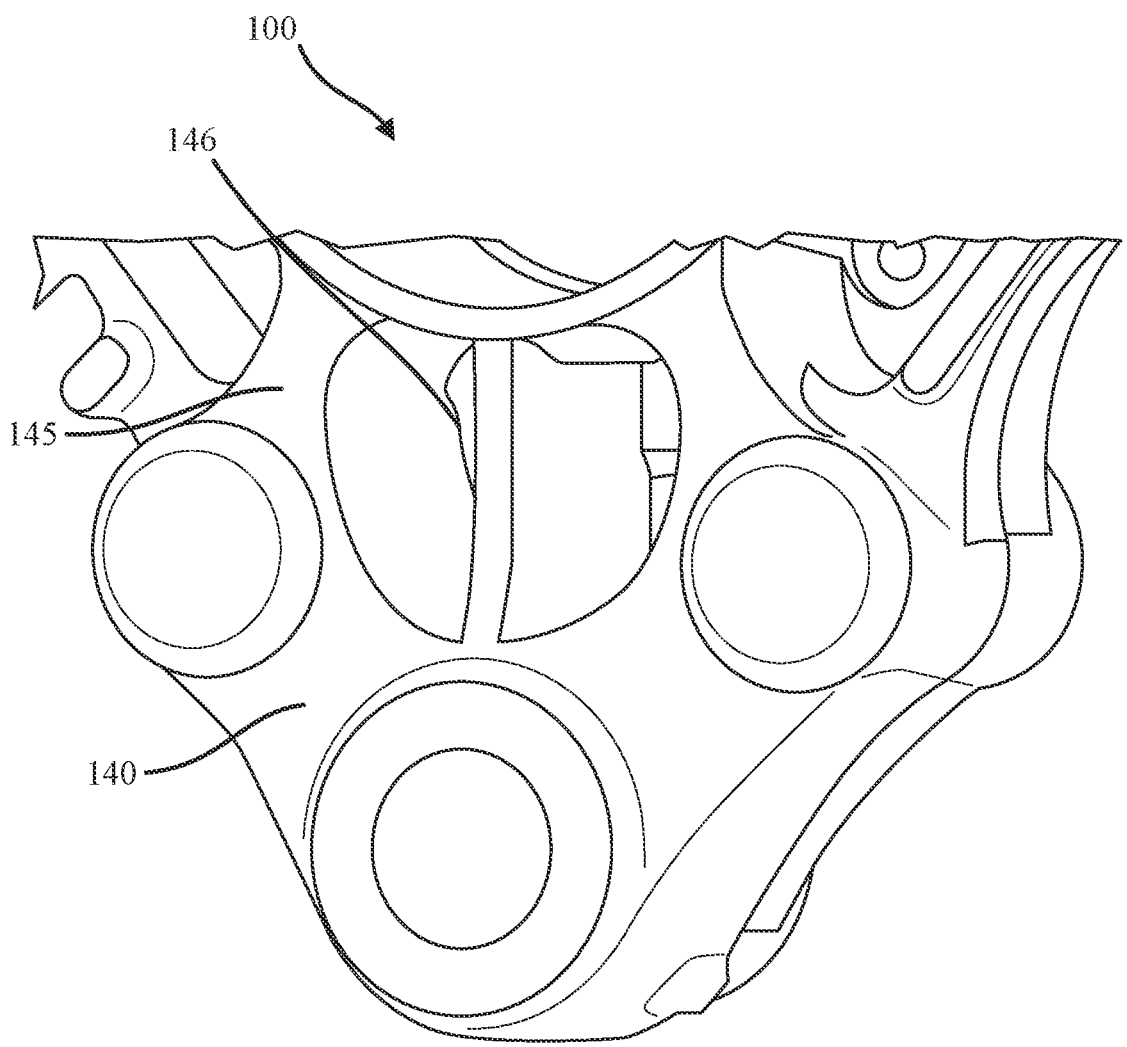
FIG. 2 illustrates a perspective view of a portion of a piston housing, in accordance with various embodiments.

Referring now to FIG. 2, a perspective view of a portion of the piston housing 100 from FIG. 1 is illustrated, in accordance with various embodiments. In various embodiments, the structural rib 160 may extend axially from a first surface 145 defined by the torque takeout arm 140 to a second surface 146 defined by the torque takeout arm 140, the second surface 146 being axially opposite the first surface 145. In this regard, the structural rib 160 may be designed for ease of manufacturing.

In various embodiments, the structural rib 160 may extend a shorter axial distance than the torque takeout arm 140. For example, with reference now to FIG. 3, a structural rib 260 having a shorter axial distance relative to an axial distance of the torque takeout arm 140 is illustrated. As the structural rib 260 is sized and configured to dampen vibrations of the piston housing assembly, the size of the structural rib may be reduced, as illustrated. For example, an axial distance of the structural rib may be between 20% and 80% of the axial distance of the torque takeout arm 140, or between 30% and 70% of the axial distance of the torque take arm, or the like.

In various embodiments, the structural ribs 160, 260 disclosed herein, are configured to dampen vibrations of the piston housing 100 during braking operations. In this regard, the structural ribs 160, 260 extend in some manner from any portion of the main annular ring 110 through the aperture 150 defined by the torque takeout arm 140 to the torque takeout annular ring. As such, the structural ribs 160, 260 directly couple the main annular ring 110 to the torque takeout annular ring 120 for vibration dampening, or the like.

Figure 3:
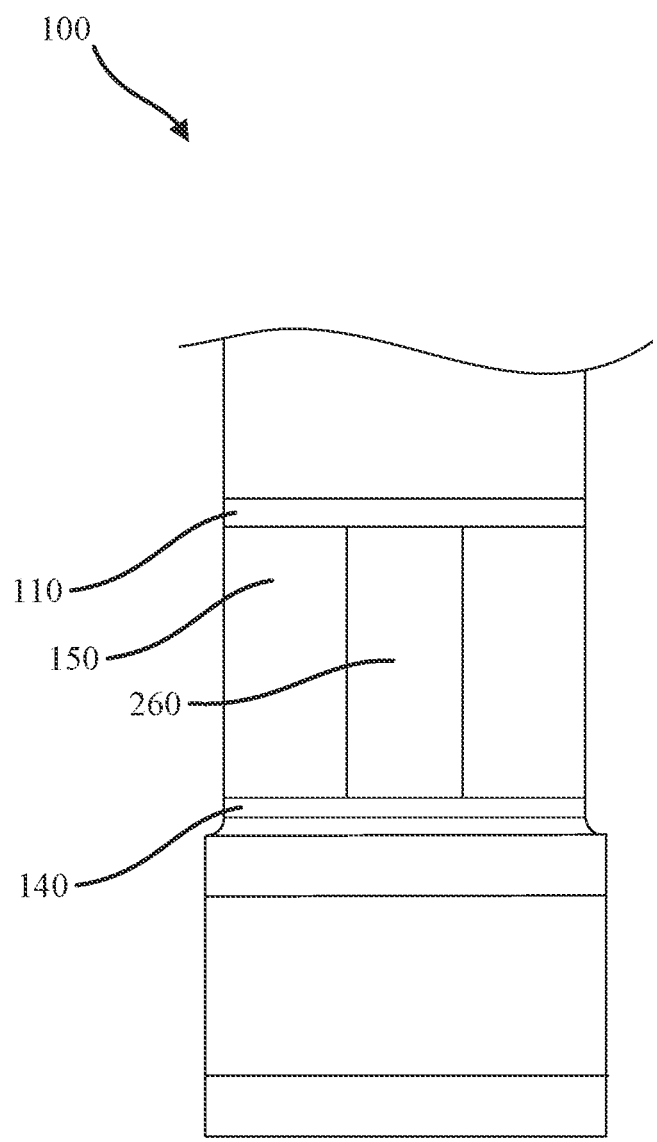
FIG. 3 illustrates a cross-sectional view of a portion of a piston housing, in accordance with various embodiments.
Figure 4:
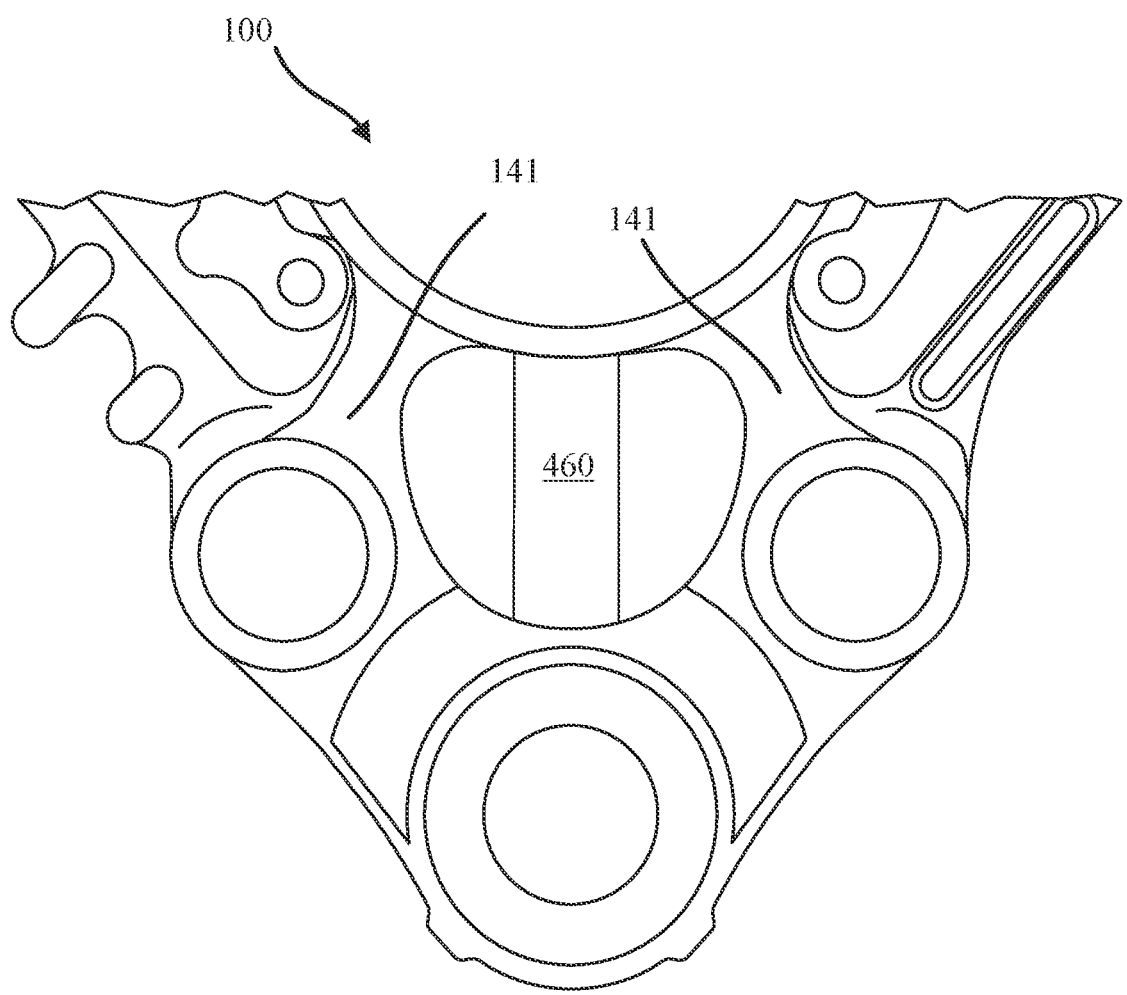
FIG. 4 illustrates a view of a portion of a piston housing, in accordance with various embodiments.

Referring now to FIG. 4, a plan view of a portion of a piston housing assembly 400, in accordance with various embodiments, is illustrated. The piston housing 100 comprises the torque takeout arm 140 as shown in FIGS. 1-3. The piston housing assembly further comprises a structural rib 460 having a thickness greater than structural rib 160, 260 in the circumferential direction. In this regard, structural rib 460 may significantly reduce an axial distance and optimize a preferred shape to dampen vibrations of the piston housing. For example, the axial distance shown in FIG. 3 may be reduced to between 5% and 15% of the axial distance of the torque takeout arm 140 in accordance with various embodiments.

Figure 5:
FIG. 5 illustrates a method of retrofitting a structural rib on a piston housing, in accordance with various embodiments.
Figure 5:
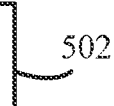
Figure 5:
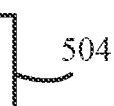

Referring now to FIG. 5, a method 500 of retrofitting a piston housing assembly with a structural rib is illustrated in accordance with various embodiments. In various embodiments, the method 500 comprises coupling a first end of a structural rib to a main annular ring of a piston housing assembly. The main annular ring may define a center bore of the piston housing assembly. The center bore may be configured for mounting the piston assembly to a landing gear axle or other wheel support. In various embodiments, the first end of the structural rib may be coupled via welding, brazing, or the like.

In various embodiments, the method 500 further comprises coupling a second end of the structural rib to a torque takeout annular ring of the piston housing (step 504). In various embodiments, the torque takeout annular ring may define a torque takeout bore configured to couple to a brake rod of a landing gear assembly. In various embodiments, the second end of the structural rib may be coupled via welding, brazing, or the like. In various embodiments, the retrofit may provide additional vibrational dampening of the piston housing assembly during operation of a respective landing gear assembly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A piston housing, comprising:
   a main annular ring defining a main bore;
   a torque takeout annular ring defining a torque takeout bore;
   a torque takeout arm extending from the main annular ring to the torque takeout annular ring and defining an aperture therethrough; and
   a structural rib disposed within the aperture and extending from the main annular ring to the torque takeout annular ring.

2. The piston housing of claim 1, wherein the torque takeout arm is configured to provide for transfer of torque from a brake rod coupled to the torque takeout bore to an axle coupled to the main bore.

3. The piston housing of claim 2, wherein the structural rib is configured to dampen vibration of the piston housing during a braking event.

4. The piston housing of claim 1, further comprising a first chamber configured to house a first piston and a second chamber configured to house a second piston, the first chamber and the second chamber being supported by the torque takeout arm.

5. The piston housing of claim 4, wherein the torque takeout arm comprises a first leg extending from the main annular ring to the first chamber and a second leg extending from the first chamber to the torque takeout annular ring.

6. The piston housing of claim 5, wherein the torque takeout arm further comprises a third leg extending from the main annular ring to the second chamber and a fourth leg extending from the second chamber to the torque takeout annular ring.

7. The piston housing of claim 1, further comprising a plurality of chambers disposed radially outward of the main annular ring, each chamber in the plurality of chambers configured to house a piston therein.

8. The piston housing of claim 7, wherein:
the plurality of chambers includes a first chamber and a second chamber; and
the torque takeout arm structurally couples the main annular ring, the first chamber, the torque takeout annular ring, and the second chamber together.

9. The piston housing of claim 1, wherein the piston housing is a monolithic component.

10. A system for mitigating vibrations in an aircraft brake system, the system comprising:
a main annular ring defining a main bore, the main bore configured to couple to an axle of a landing gear assembly;
a torque takeout annular ring defining a torque takeout bore, the torque takeout bore configured to couple to a brake rod of the landing gear assembly;
a torque takeout arm extending from the main annular ring to the torque takeout annular ring and defining an aperture therethrough, the torque takeout arm configured to provide for transfer of torque from the brake rod to the axle; and
a structural rib disposed within the aperture and configured to dampen vibration of the system during a braking event.

11. The system of claim 10, wherein the structural rib extends from the main annular ring to the torque takeout annular ring.

12. The system of claim 10, wherein the torque takeout arm extends from the main annular ring to the torque takeout annular ring.

13. The system of claim 12, further comprising a first chamber configured to house a first piston and a second chamber configured to house a second piston, the first chamber and the second chamber being supported by the torque takeout arm.

14. The system of claim 13, wherein the torque takeout arm comprises a first leg extending from the main annular ring to the first chamber and a second leg extending from the first chamber to the torque takeout annular ring.

15. The system of claim 14, wherein the torque takeout arm further comprises a third leg extending from the main annular ring to the second chamber and a fourth leg extending from the second chamber to the torque takeout annular ring.

16. The system of claim 10, further comprising a plurality of chambers disposed radially outward of the main annular ring, each chamber in the plurality of chambers configured to house a piston therein.

17. The system of claim 16, wherein:
the plurality of chambers includes a first chamber and a second chamber; and
the torque takeout arm structurally couples the main annular ring, the first chamber, the torque takeout annular ring, and the second chamber together.

18. The system of claim 10, further comprising a piston housing, the piston housing being a monolithic component.

19. A method of retrofitting a structural rib on a piston housing assembly, the method comprising;
coupling a first end of the structural rib to a main annular ring of the piston housing assembly;
coupling a second end of the structural rib to a torque takeout annular ring of the piston housing assembly, wherein the structural rib is disposed within an aperture defined by a torque takeout arm extending from the main annular ring to the torque takeout annular ring.

20. The method of claim 19, wherein:
the first end is coupled to the main annular ring via at least one of welding or brazing, and
the second end is coupled to the torque takeout annular ring via at least one of welding or brazing.

\* \* \* \* \*